United States Patent [19]

Neuberger et al.

[11] Patent Number: 5,675,678
[45] Date of Patent: Oct. 7, 1997

[54] FLEXIBLE SYSTEM FOR LINEARLY DISTRIBUTED ILLUMINATION

[75] Inventors: Wolfgang Neuberger, F.T. Labuan, Malaysia; Sergej G. Krivoshlykov, Moscow, Russian Federation

[73] Assignee: Ceram Optec Industries Inc., East Longmeadow, Mass.

[21] Appl. No.: 542,032

[22] Filed: Oct. 10, 1995

[51] Int. Cl.$^6$ .................. G02B 6/26; G02B 6/42
[52] U.S. Cl. .................. 385/31; 385/147
[58] Field of Search .................. 385/31, 39, 142, 385/147, 125, 117, 124, 100, 900; 356/356, 358, 357, 446; 250/551, 208.3, 368, 227.2; 362/32; 264/1.24

[56] References Cited

U.S. PATENT DOCUMENTS

| | | | |
|---|---|---|---|
| 3,589,800 | 6/1971 | Cardona | 385/147 |
| 3,641,332 | 2/1972 | Reick et al. | 362/32 |
| 3,676,671 | 7/1972 | Sheldon | 250/227.2 |
| 4,196,986 | 4/1980 | Moyroud | 355/1 |
| 4,884,891 | 12/1989 | Borsboom | 356/446 |
| 5,333,227 | 7/1994 | Ishiharada et al. | 385/100 |
| 5,452,395 | 9/1995 | Schichman | 385/125 |

Primary Examiner—Akm E. Ullah
Attorney, Agent, or Firm—Bolesh J. Skutnik

[57] ABSTRACT

Linearly distributed illumination systems based on flexible optical waveguides or optical fibers are described for both high brightness and low brightness applications. Light illumination at preselected locations is accomplished by transferring light from the light carrying core region to the outer layers of the waveguide/fiber structure. A curled waveguide, typically having a rectangular band-like core cross section and cut at an angle facing the light source, serves to optically couple light with simplicity and high efficiency into the waveguide for high brightness applications. Grooves into sides of the band waveguide, in either the small or large dimension, provide a means for removing light from the core to illuminate preselected regions along the length of the band waveguide. Complex systems comprising a bundle of band waveguides and an optical feedback means for automatic control of illumination brightness are also described. For low brightness applications an illuminating system comprising a flexible band covered with a fluorescent material in sites along the length of the waveguide where illumination is required for a specific application.

17 Claims, 6 Drawing Sheets

FLEXIBLE SYSTEM FOR LINEARLY DISTRIBUTED ILLUMINATION

BACKGROUND OF THE INVENTION

1. Field of the Invention

The invention relates generally to optical illumination systems, and more specifically to the illumination system based on light conducting band waveguides having coupling means to a light source as well as highly flexible light emission means. It also relates to the illumination system based on optical fibers delivering the light from a light source and pumping a fluorescent material in places where it should illuminate light. The systems can find many important practical applications, especially for illumination under such conditions when employing of standard electrical illumination systems is dangerous.

2. Information Disclosure Statement

Optical fiber illumination systems are gaining acceptance as flexible means to illuminate various areas and spots from a central powerful light source. These systems typically use plastic (PMMA or Polycarbonate) fibers with core diameters of up to 1 mm. They can be in bundled or individual form to collect light from a powerful light source and deliver it to a spot or a surface over distances of up to 25 m where illumination is needed. A lens tip is typically used to terminate the fiber or the bundle and project the light on the target. Typical example of such system is shown in FIG. 1. Light from source 1 is coupled with the help of optics 2 into optical fiber bundle 3 delivering the light to output line 4 illuminating the light from a number of illuminating spots 5.

This state of the art is problematic in so far as single fibers are difficult to focus the light at, and fiber bundles are more difficult to handle, requiring in fact an extra tube or other means to hold them together. If individual fibers are made too thick, then flexibility is compromised.

There is a great need in high brightness optical waveguide illumination systems for application in swimming pools, discotheques, aircrafts, cars and other places where employing of standard electric wire based illumination systems is undesirable. Such an optical waveguide system should provide easy installation by untrained personnel without special optical fiber experience, it should be reasonably inexpensive, versatile to encompass a required range of spot sizes, distribution and control patterns and also include a control means not requiting additional electric sources.

Optical systems for low intensity illumination have also numerous applications. They are used in buildings, aircrafts, ships, etc. to mark the way to exits in emergency situations when the main powerful illumination is switched off. They can also be used like parking lights in cars, for indicating parking places, etc. Electrical wire based systems are usually employed for such a illumination. The main disadvantages of these systems are considerable energy consumption and the use of electrical wires. Electrical currents in this system may become a hazard if the system must operate in an explosive environment.

The present invention offers also a new low intensity illumination system based on an optical fiber delivering light to a fluorescent material. The system is designed to be highly flexible and to have a very long lifetime. It does not employs any metallic wires and electrical currents, an important advantage for operation in explosive environments. Finally, the light in the system can be supplied by a laser diode or a light emitting diode, which consume very little energy.

OBJECTS AND SUMMARY OF THE INVENTION

It is an object of the present invention to provide a high brightness flexible illumination system including means to facilitate launching commercial light sources.

Another object is to provide connection means and out-coupling means to evenly or spot illuminate small or large objects.

Further object of the invention is to provide means for simple installation of a illumination system by combining a number of separate segments of the optical band waveguides.

Still other object is to provide an optical means for control of illuminated brightness and means for automatic optical feedback control.

Another object of the present invention to provide also a low intensity flexible optical fiber illumination system employing an optical fiber delivering light from a source to a fluorescent material which can provide low level illumination.

Still further object of the invention is to specify effective means of coupling light from the fiber into the fluorescent material.

An additional object of the invention is to specify a flexible design of an illuminating system providing for illumination only in prespecified sections.

Briefly stated, the present invention provides illumination systems based on flexible light conducting waveguides for both high and low intensity illuminations. In the case high intensity illumination system, a band light conducting waveguide receives the light in an efficient and simple manner by curling the waveguide angled-cut starting end in front of a light emitter. Grooves in the small or large sides of the band waveguide are used for side irradiation of the light from the waveguide to illuminate desired regions along its length. An optical illumination system comprising a bundle of band waveguides and having optical feedback means for automatic controlling the illumination brightness is also described. The low intensity optical fiber illumination system comprises a flexible band covered with a fluorescent material and an optical fiber delivering light from a source to pump the fluorescent material in the places where it should radiate light.

The above, and other objects, features and advantages of the present invitation will become apparent from the following description read in conjunction with the accompanying drawings.

DESCRIPTION OF PREFERRED EMBODIMENTS

Figure 1:
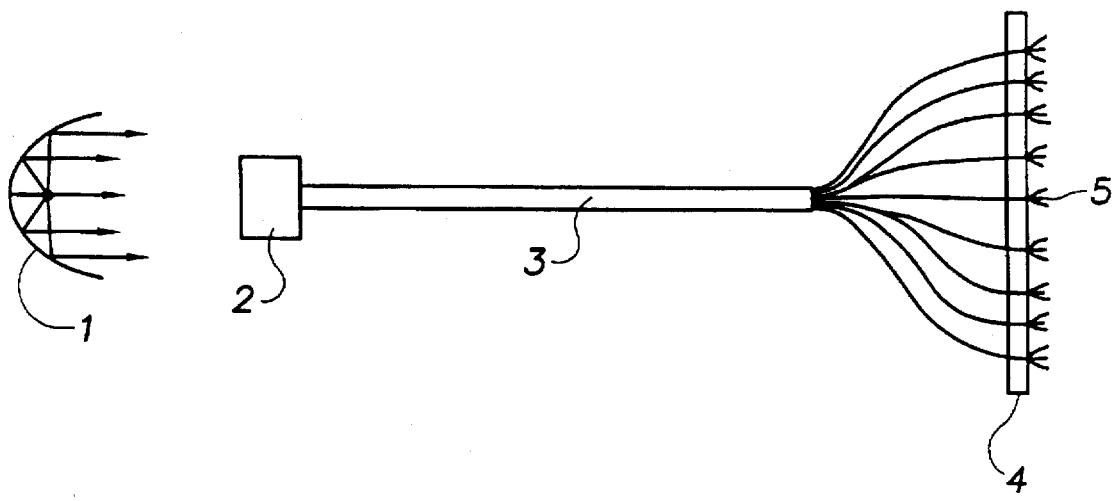
FIG. 1 shows a current state of the art optical fiber illumination system for borderline lighting.
Figure 2:
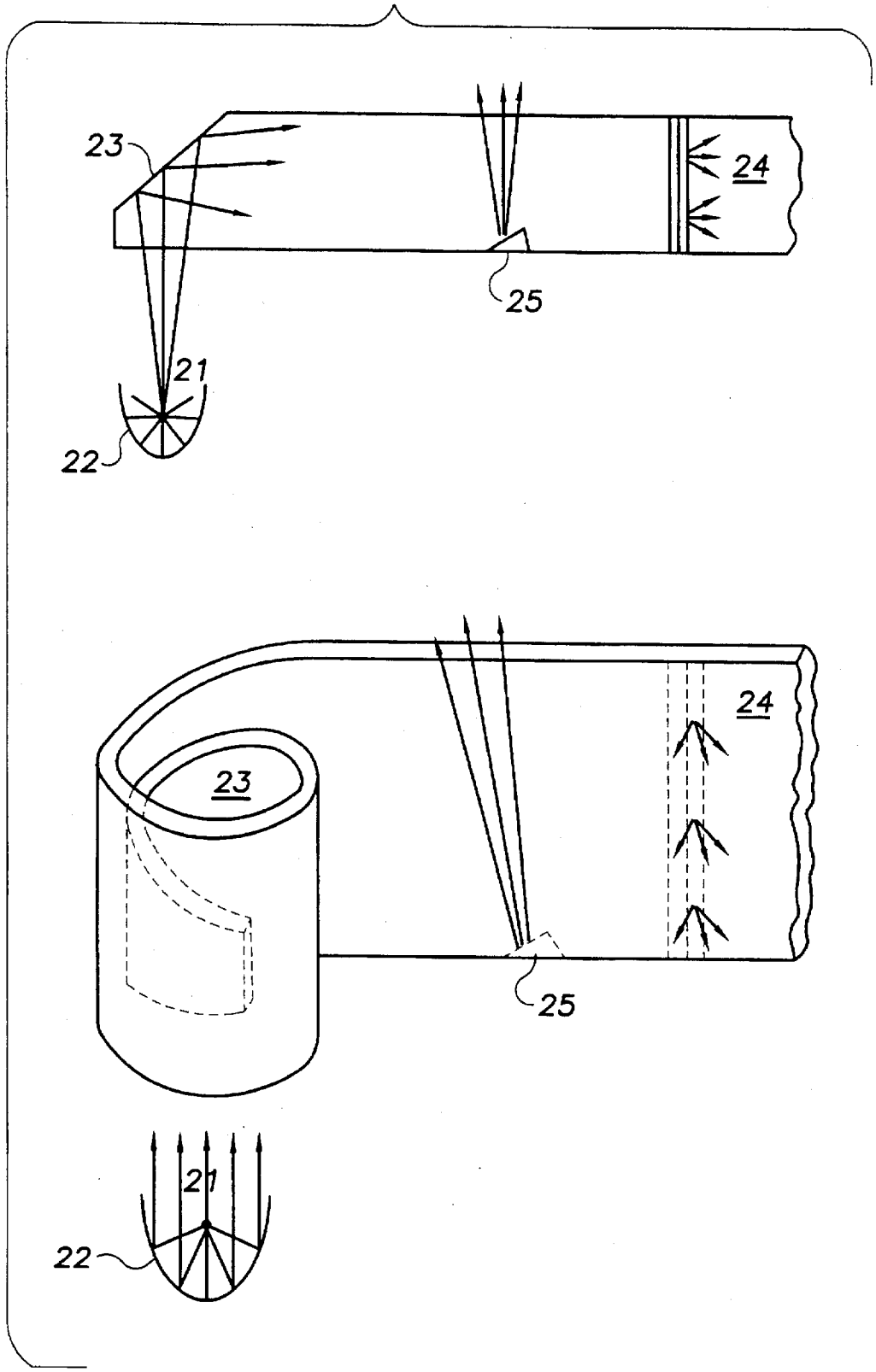
FIG. 2 shows one embodiment of this invention.

One preferred embodiment of the flexible optical band illuminating system of this invention is illustrated in FIG. 2. The light illuminated by source 21 and concentrated with condenser or reflector 22 is coupled into angle-cut end 23 of flexible optical band waveguide 24 which is curled in front of light source 21. Flexible optical band waveguide 24 may have a core of rectangular cross section surrounded by a cladding with lower refractive index in order to provide its waveguiding properties. For better flexibility the band waveguide can be fabricated from such materials as PMMA or Polycarbonate.

Figure 3:
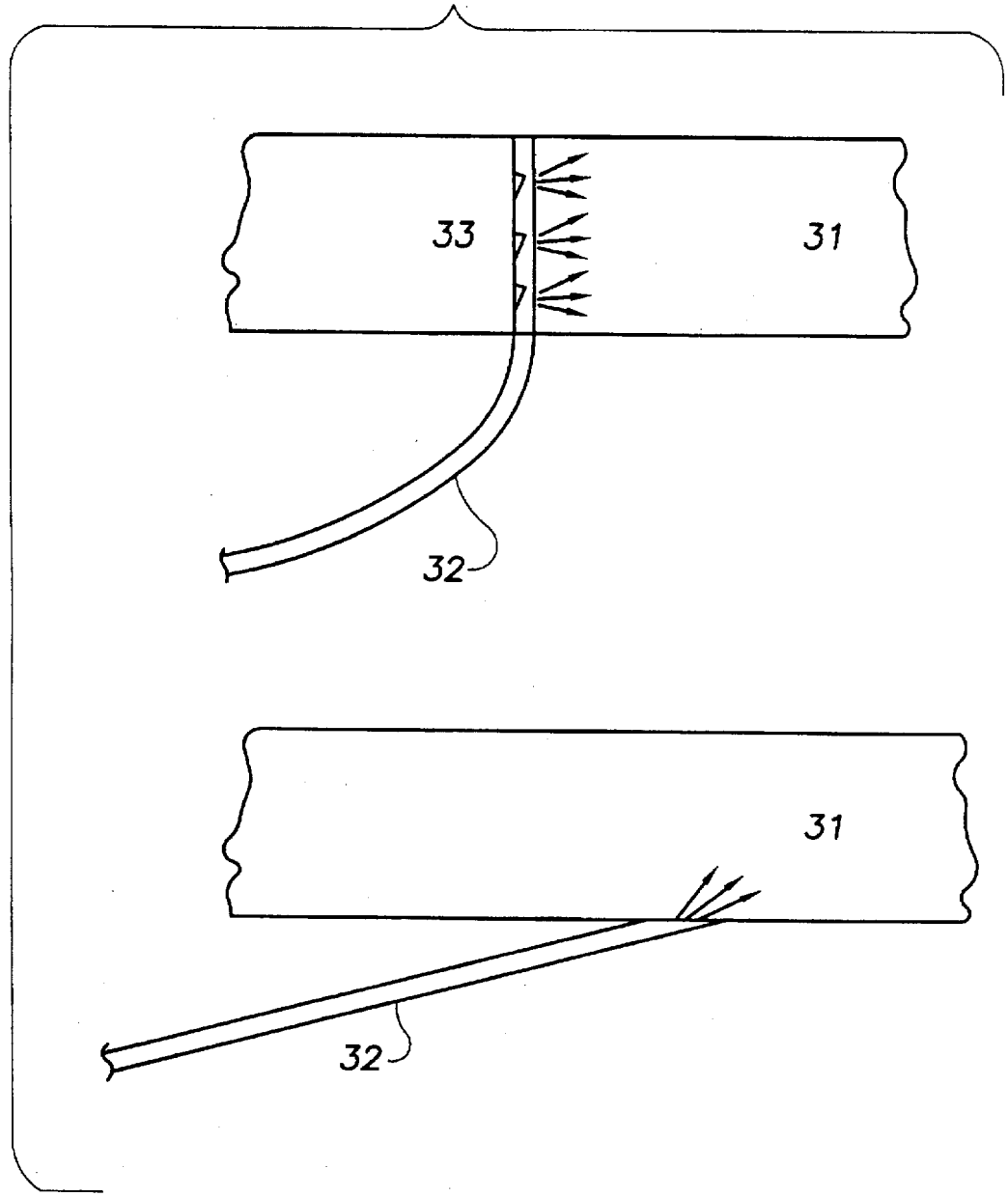
FIG. 3 shows another embodiment of this invention including long distance illumination taking a quartz fiber bundle and using the individual fibers to "recharge" the band at certain intervals.

Surface grooves 25 made across optical band waveguide 24 reflect part of the light propagating along the band waveguide to provide its side illumination in desired places. The groves can be made on both sides of the waveguide surface and be periodically spaced depending of desired direction and region of illumination. The light intensity decreases as the light propagates through the band waveguide. Therefore, the groove depth should increase as a function of length, in order to provide even illumination. The decreasing of the light intensity can also be compensated by periodic "recharging" along the band using individual fibers of a optical fiber bundle to supply required light energy. FIG. 3 illustrates two preferred embodiment of such recharging. Band waveguide 31 is recharged by fiber 32 delivering light from an optical fiber bundle. Side illumination of the light from optical fiber 32 embedded into waveguide 31 can be provided by small incisions 33 made in the fiber surface.

The groove light exits in the plastic band waveguide can be easily "self made" by the customer in the places where illumination is required. An illumination tool that is delivered in the kit may enable the installer to scratch the surface of the band waveguide to a predetermined depth in one or more locations under a total reflection angle. This area can then be covered up by a sticking film, so as to include the air permanently and avoid dirt. Alternatively, "clips" can be provided that form metal reflectors in these grooves. The band waveguides can also be joined to purchased, prefabricated exit ports ('lamps').

Figure 4:
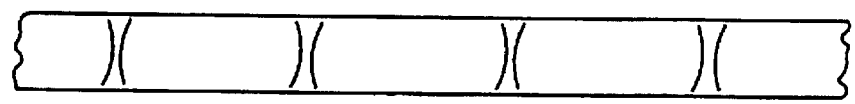
FIG. 4 shows a segmented optical band waveguide.

In one preferred embodiment shown in FIG. 4 the light conducting band waveguide is combined from separate segments which can be easily connected to each other. Such a segmented band waveguide provides high flexibility in installation of the illuminating system. It can be easily split and affixed to walls (or behind transparent walls). Even untrained personnel without special fiber optical experience can easily combine the light illumination system and adjust it to specific illumination conditions required. Moreover, one of these waveguide segments can be conveniently used for control purpose and split off at the switch point.

Figure 5:
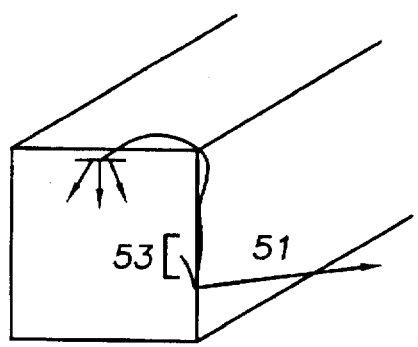
FIG. 5 shows a schematic of optical illumination system having a switch to control brightness and/or on/off the light source near the radiation output.
Figure 6:
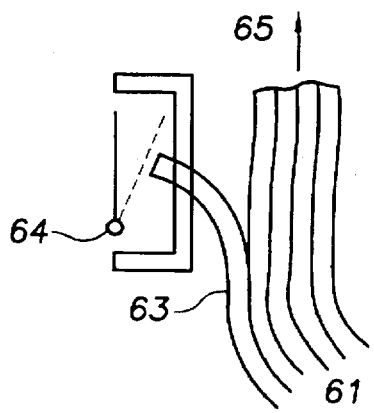
FIG. 6 illustrated operation of light switch.

The all-optical means of control of the illuminating light brightness have important advantages in the case when employing standard electrical circuits are not desirable. Typical examples are illumination of swimming pools or rooms containing explosive materials. One preferred embodiment of such illumination system with optical control is schematically shown in FIG. 5. Light conducting bundle of band waveguides 51 is used to illuminate room 52 in desired regions. One band waveguide, waveguide 53, in bundle 51 is employed for optical control of the brightness of illuminated light. FIG. 6 illustrates operation of this controlling waveguide. Controlling waveguide 63 of bundle 61 is always illuminated. Switch 64 controls light reflection from end face of waveguide 63. When switch 64 is on the light reflects back to central control and light source and all band waveguides 65 of bundle 61 are illuminated by the central light source. In the case when switch 64 is in off position, the light does not returns to the central control and light source and waveguides 65 are not illuminated.

Figure 7:
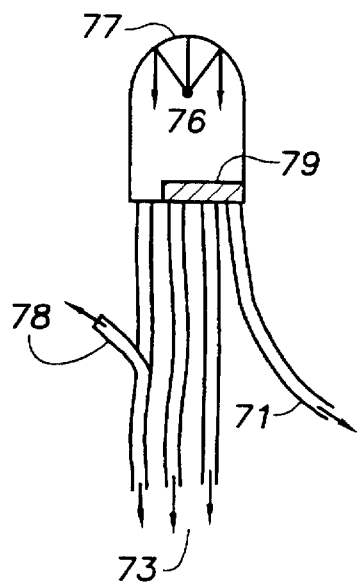
FIG. 7 illustrates one preferred embodiment of a light source.

For uniform distribution of intensity of the central light source between different light conducting band waveguides of the bundle, the light source can be placed inside a special configured resonator chamber as shown in FIG. 7. Light from central light source 76 reflects from walls of resonator 77 which is configured so as to provide a uniform illumination of band waveguides in bundle 71. Control waveguide 73 in the bundle 71 is always illuminated while illumination of other waveguides in bundle 71 is controlled by the reflected signal 78 coming from controlling waveguide 73. Means 79 of variation of illumination of the bundle 71 provide changing of light transmittance depending on the signal coming from controlling waveguide 73. For example, this means can include either electrically controlled mechanical arrangement or some material whose transparency can be controlled with an electrical signal coming from a receiver illuminated by the light from controlling waveguide 73.

Controlling waveguide 73 can also be employed for a feedback in the illumination system with automatic stabilization of illumination. A signal of feedback light from illumination system delivered by waveguide 73 can be used for automatic controlling brightness of the light illuminating the band waveguides in bundle 71.

Figure 8:
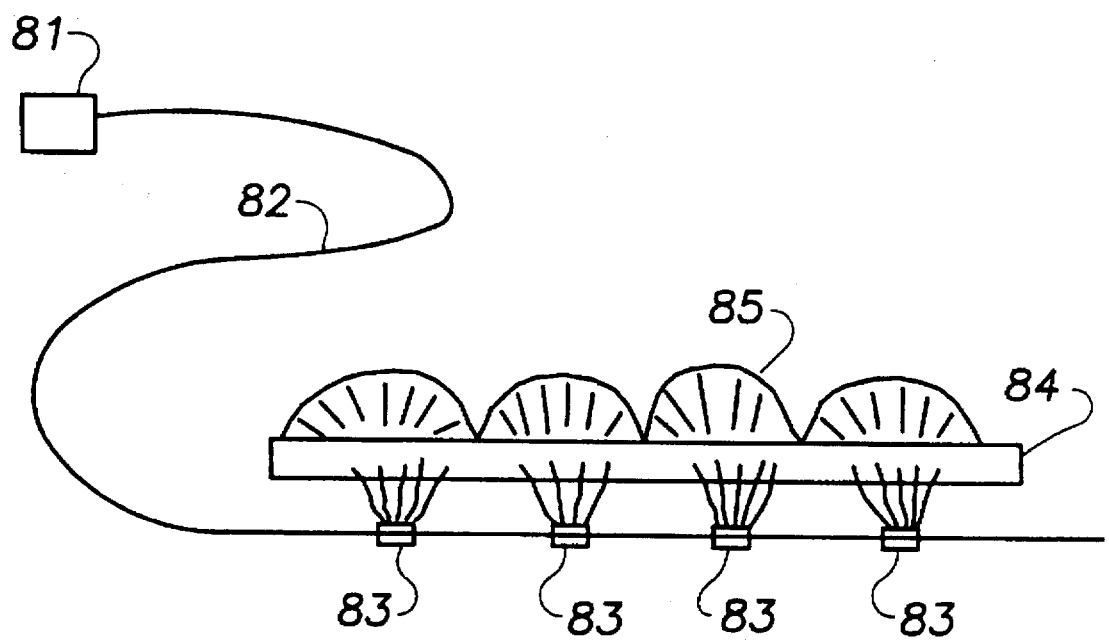
FIG. 8 shows a schematics of the optical fiber fluorescent illuminating system.

A preferred embodiment of flexible optical fiber fluorescence system of the present invention is shown schematically in FIG. 8. It comprises a light source 81, for example, a laser diode, generating light of wavelength $\lambda$ optically coupled to light transmitting fiber 82. The fiber has means 83 of lateral radiation of light in some specific places along its length. The light irradiated from the fiber illuminates a fluorescent material 84 which is optically connected to the fiber. As a result of such a pumping on the wavelength $\lambda$, the fluorescent material radiates light of longer wavelength $\lambda_1 > \lambda$.

Lateral radiation of the light from the fiber in the regions along its length where illumination is required can be provided, for example, by creating some scattering in this regions at a core/cladding interface of the fiber. Side irradiation of the fiber can also be realized with the help of an appropriate grating created either inside the fiber or at the core/cladding interface.

To fabricate the scattering regions or the grating on the surface of a fiber core, the fiber cladding usually has to be removed. It is convenient to use polymer fibers in this system providing a possibility of simple fabrication of such scattering regions. Another option is to employ quartz-polymer fibers described in U.S. Pat. No. 4,511,209. In this case the polymer cladding can easily be partly removed from quartz core of such fibers before fabricating the scattering regions on the fiber core.

Figure 9:
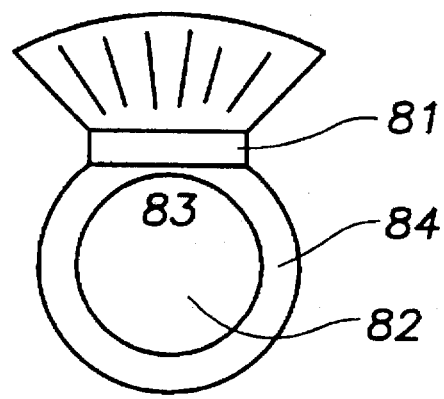
FIG. 9 shows an optical fiber covered with a film of a fluorescent material.

A fluorescent material, for example a polymer containing fluorescent dyes, can be deposited directly on the fiber in the scattering regions. One preferred embodiment of the fluorescent fiber is shown in FIG. 9. A fluorescent polymer film 91 is deposited on fiber core 92 in scattering region 93 where fiber cladding 94 is partially removed. In another preferred embodiment the fiber has a quartz core and a polymer cladding containing fluorescent dyes. In this case the system can operate without scattering regions in the fiber core. Evanescent penetration of light from fiber core into the fluorescent cladding results in radiation of light by the cladding over all the fiber length.

Figure 10:
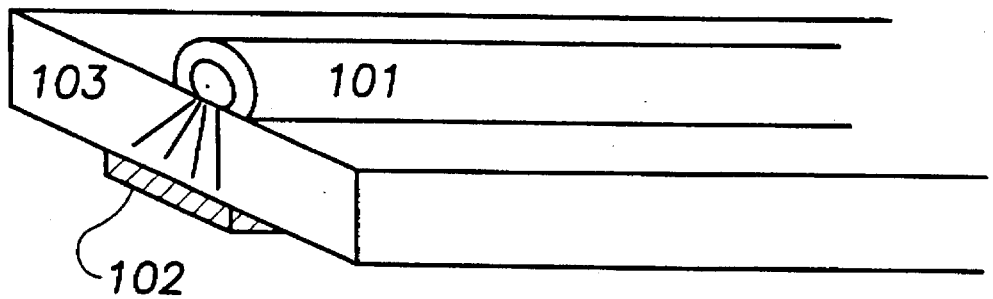
FIG. 10 shows one preferred embodiment of a flexible optical fiber fluorescent band when fiber and fluorescent film are placed on opposite surfaces of the bend.
Figure 11:
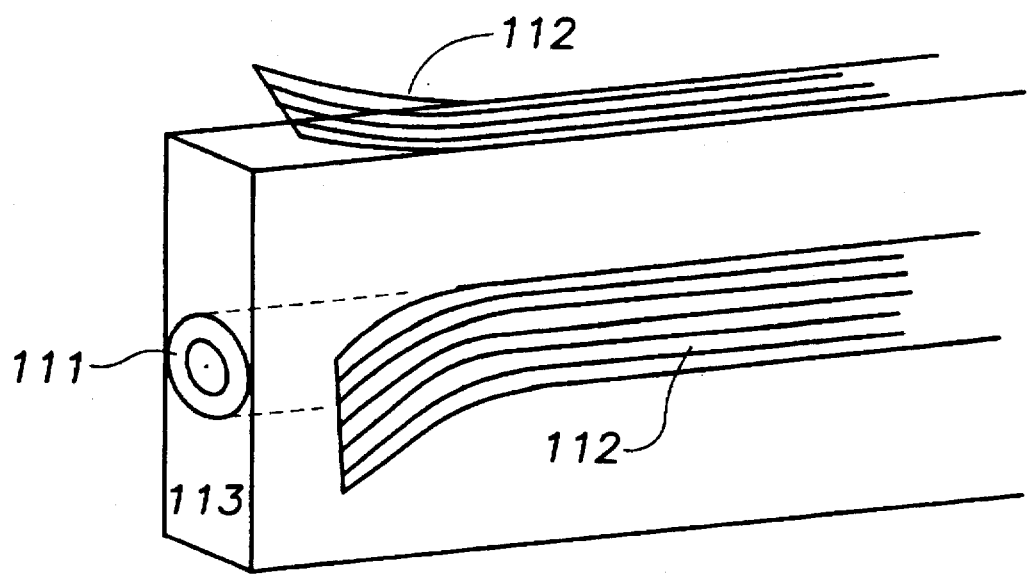
FIG. 11 shows another preferred embodiment of a flexible optical fiber fluorescent band when the fiber is placed inside the bend.

Typical optical fibers have a rather small cross section. Therefore fluorescent films deposited directly on the fibers can not be made sufficiently large, as would be desirable for some illuminating systems. To increase the size of the fluorescent film the distance between this film and the radiating fiber section should be increased. In one preferred embodiment shown in FIG. 10, light radiating fiber 101 and fluorescent film 102 are glued on opposite sides of an optically transparent plastic band 103 which functions as a spacer. In another preferred embodiment shown in FIG. 11, light radiating fiber 111 is placed inside plastic band 113. In this case fluorescent film 112 can be glued on both sides of the band resulting in a multidirectional illumination system. The fluorescent film 112 can be fabricated in such a way to provide an easy possibility either to glue it on or remove it from surface of the plastic band. In this case the illumination system can be easily configured to a desired shape, providing illumination only in specific regions.

Having described preferred embodiments of the invention with reference to the accompanying drawings, it is to be understood that the invention is not limited to the precise embodiments, and that various changes and modifications may be effected therein by skilled in the art without departing from the scope or spirit of the invention as defined in the appended claims.

What is claimed is:

1. A flexible, linearly distributed illumination system comprising:
   at least one flexible light conducting band waveguide having a substantially rectangular cross section core surrounded by a low index cladding;
   at least one central light source optically connected to at least one of said flexible light conducting band waveguides; and
   means for removing light from said waveguide's core to illuminate preselected sites along said waveguide's length.

2. An illumination system according to claim 1, wherein said band waveguide comprises at least two segmented waveguides capable of being interconnected.

3. An illumination system according to claim 2, wherein said at least one central light source has means to control brightness at an input end of said band waveguide and at least one of said segmented waveguides is used for optical control.

4. An illumination system according to claim 2, wherein said at least one central light source has means for automatic control of power so as to substantially maintain brightness at an input end of said band waveguide and at least one of said segmented waveguides is used as a means for optical feedback control.

5. An illumination system according to claim 1, wherein said means of removing light from said waveguide's core comprises a number of grooves in said band to substantially couple light out of said band waveguide.

6. An illumination system according to claim 5, wherein said grooves are evenly spaced but vary in depth into said core to compensate for a decrease of light intensity along said band waveguide.

7. An illumination system according to claim 1, wherein said at least one central light source is optically connected to said waveguide by an angled-cut section of said band waveguide curled in front of said at least one light source.

8. An illumination system according to claim 1, wherein PMMA (polymethylmethacrylate) or polycarbonate are used as a material for said waveguide's core component.

9. A flexible, linearly distributed illumination system comprising:
   at least one light source optically connected to at least one flexible optical fiber, said optical fiber having a core and a lower refractive index cladding;
   means to radiate light from at least one side of said at least one fiber in preselected regions along said at least one fiber's length;
   a fluorescent material optically coupled to said at least one fiber and illuminated by light radiated from said at least one optical fiber in said regions along its said at least one fiber's length.

10. A flexible, linearly distributed illumination system according to claim 9, wherein said fluorescent material is placed on a surface of said fiber's cladding and said fiber's core has a least one scattering region providing lateral radiation of light from said fiber core through said cladding into said fluorescent material.

11. A flexible, linearly distributed illumination system according to claim 9, wherein said fiber's core has a substantially rectangular cross section.

12. A flexible, linearly distributed illumination system according to claim 9, wherein said fiber cladding is made of said fluorescent material.

13. A flexible, linearly distributed illumination system according to claim 9, wherein said means of light irradiation from at least one side of said fiber comprises removing said cladding down to said core at least from one side of said fiber and fabricating scattering imperfections such as patterned gratings into said fiber core.

14. A flexible, linearly distributed illumination system according to claim 13, wherein said optical fiber is placed on a surface of a flexible band made from optically transparent plastic material having a refractive index at least as large as said fiber core's refractive index, said plastic band transmits light radiated by said fiber on one side of said band to a fluorescent film placed on said band's opposite side.

15. A flexible, linearly distributed illumination system according to claim 13, wherein said optical fiber is placed inside said plastic band, said fiber illuminates the surface from at least one side of said band, and a fluorescent film is placed on said illuminated surface.

16. A flexible, linearly distributed illumination system according to claim 14, wherein said fluorescent film has a means to be temporarily affixed to said surface of said plastic band providing illumination in preselected regions.

17. A flexible, linearly distributed illumination system according to claim 15, wherein said fluorescent film has a means to be temporarily affixed to said surface of said plastic band providing illumination in preselected regions.

* * * * *